UNITED STATES PATENT OFFICE.

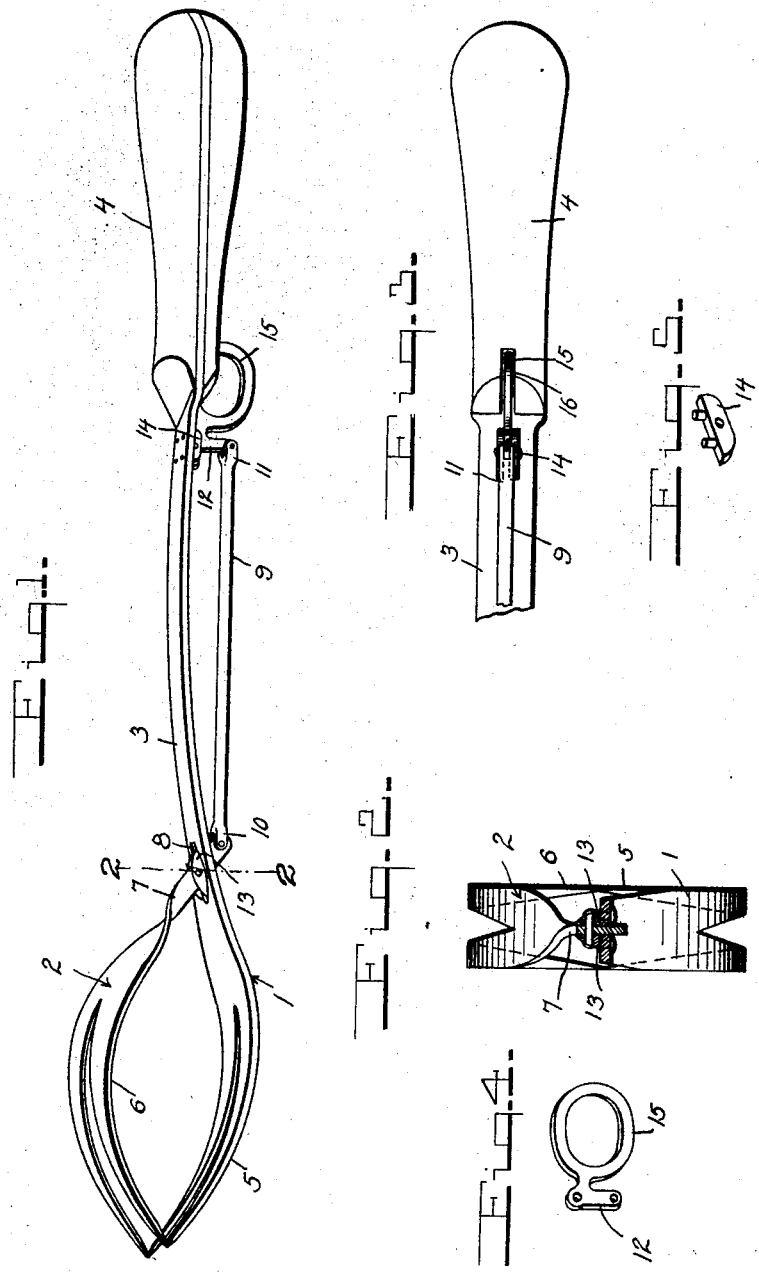

ELMER D. BROWN, OF FORT WORTH, TEXAS.

CULINARY UTENSIL.

1,386,311.  Specification of Letters Patent.  Patented Aug. 2, 1921.

Application filed March 24, 1921. Serial No. 455,235.

*To all whom it may concern:*

Be it known that ELMER D. BROWN, citizen of the United States, residing at Fort Worth, in the State of Texas, have invented certain new and useful Improvements in Culinary Utensils, of which the following is a specification.

This invention relates to improvements in culinary utensils, and more particularly forks designed especially for kitchen use.

The primary object of the invention is to so construct a fork of this character that it may be effectively used for lifting articles from a boiling pot or from an oven without exposing the hand of the user to the severe heat of the steam emanating from the pot or oven.

Another object is to provide a fork of this character which is simple yet strong and may be easily operated for gripping and releasing the object to be lifted.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view taken from the side of a utensil constructed in accordance with this invention.

Fig. 2 is a transverse section taken on the line 2—2 of Fig. 1.

Fig. 3 is a detail bottom plan view of the handle portion of the utensil.

Fig. 4 is a detail side elevation of the actuating element for the movable jaw, and Fig. 5 is a detail perspective view of one of the blocks between which the bell crank is fulcrumed.

In the embodiment illustrated, the utensil constructed in accordance with this invention comprises a stationary member 1 and a movable member 2. The stationary member 1 is here shown in the form of an ordinary kitchen fork having the usual shank 3 provided at its rear end with a wooden or other non-conducting handle 4 and at its front end with a pair of tines 5 which are curved longitudinally in the usual manner. The movable member 2 is shown in the form of a short fork, the tines 6 of which are curved in the opposite direction to the tines 5 of the member 1 and which has a short shank 7 twisted to adapt it to be passed through a longitudinally disposed slot arranged at the base of the tines 5 of the member 1 as is shown clearly in Fig. 1.

These members 1 and 2 constitute gripping jaws for engaging and lifting an article, and the jaw 2 is movable toward and away from jaw 1 by means of a rod 9 which extends substantially parallel with the shank 3 of the member 1, said rod end being preferably bifurcated as shown at 10, to receive said shank 7. The other end of rod 9 is also bifurcated as shown at 11 and is designed to receive the free end of one arm of a bell crank lever 12 which is fulcrumed on the rear face of the shank 3 adjacent the handle 4 as will be presently more fully described. Upstanding lugs 13 are arranged on opposite sides of the slot 8 on the front face of the fork and between which the shank 7 of the movable member 2 is pivoted. These lugs 13 may be either cast integral with the fork member 1 or may be secured thereto in any desired manner.

The bell crank lever 12 is fulcrumed between two laterally spaced longitudinally extending blocks as 14 which may be made integral with the shank member 3 or riveted thereto as herein shown. The rear end of this bell crank lever 12 is provided with an eye or loop 15 with which is designed to be engaged the finger of the operator for actuating the movable member 2. This loop or eye 15 is adapted to enter a recess 16 formed in the handle 4 at its inner end so that the lever 12 may be freely moved inwardly and outward for operating the rod 9 to open and close the gripping jaw 2. It will thus be seen that by moving the bell crank rearwardly by a pull exerted on the loop 15, rod 9 will also be moved longitudinally toward the rear and thereby cause the jaw 2 to swing on its pivot into closed position and that the forward movement of this rod 9 caused by a push exerted on the bell crank will operate to open this jaw.

From the foregoing description, taken in connection with the accompanying drawings, the advantage of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim—

A device of the class described comprising a fork having a shank with tines at one end and a handle at the other, said shank having a longitudinally extending slot at its junction with said tines, upstanding apertured flanges disposed on opposite sides of said slot, a coöperating fork having a short shank extending through the slot in said first mentioned shank, the shank of said short fork being twisted to provide for this passage, a pintle pivotally connecting said shank in said slot, said pintle extending through said apertured flanges, laterally extending spaced flanges carried by the shank of said first mentioned fork on its rear face near the handle thereof, a bell crank fulcrumed between said flanges and having an operating handle at one end, a rod connected at one end with the other end of said bell crank and at its other end with the terminal of the shank of the pivoted fork.

In testimony whereof I affix my signature in presence of two witnesses.

ELMER D. BROWN.

Witnesses:
   JESSE HOLT,
   JOHN BONNER.